United States Patent Office 3,465,012
Patented Sept. 2, 1969

3,465,012
PROCESS FOR ALKYLATING, ALKENYLATING AND ARYLATING LEAD COMPOUNDS
Richard Muller, Radebeul, Sigrid Reichel, Dresden, and Christian Dathe, Radebeul, Germany, assignors to Institut für Silikon- und Fluorkarbon Chemie, Radebeul, Germany
No Drawing. Filed July 27, 1967, Ser. No. 656,368
Int. Cl. C07f 7/24
U.S. Cl. 260—437                 4 Claims

ABSTRACT OF THE DISCLOSURE

Process of producing metalorganic compounds of heavy metals by means of organofluorosilicic acids, more particularly starting from a lead salt or a lead oxide and converting them into organolead compounds.

---

It is known from our own experimental work to make organometal compounds from metals such as copper, silver, mercury, antimony and bismuth salts by reacting said salts with alkyl-, alkenyl- or arylfluorosilicates. As alkyl groups we mention for instance methyl, ethyl, propyl, butyl, chloropropyl groups, as alkenyl for instance the vinyl group, and as aryl e.g. the phenyl group. For carrying out the conversion, the aqueous solutions of metal salts are simply reacted with solutions of organopentafluorosilicates, whereby the metalorganic compounds are easily formed and may be subsequently simply separated.

Another way of producing the above-mentioned metalorganic compounds consists of using for the reaction with the metal salts, instead of the organofluorosilicates, trifunctional organosilanes, the conditions being so chosen that organofluorosilicic acids or their salts will be formed in situ.

For instance, phenylmercury acetate may be obtained by addition of phenyltriethoxysilane to a solution of mercury diacetate to which hydrofluoric acid had been added, a precipitate being formed which can easily be collected on a filter. It is a particular advantage of the present process that it can be carried out in aqueous solution. Instead of phenyltriethoxysilane all other trifunctional organosilanes may be similarly used when they contain radicals linked to the silicon atom which can be exchanged with fluorine.

In continuing our investigation, it has now been found that organotrifluorosilanes and organopentafluorosilicates are useful for the production of organolead compounds which may be used e.g. as anti-knock agents. The process according to the invention has the advantage that now we are able directly to prepare partly organylated lead compounds, whereas up to the present they were only accessible by way of the perorganylated compounds.

Generally speaking, the process according to the invention can be carried out as follows.

A lead salt or a lead oxide, preferably the water soluble lead tetraacetate, is reacted e.g. with phenyltrifluorosilane in an aqueous solution of ammonium fluoride and hydrofluoric acid; triphenyllead fluoride will be formed in good yield, the reaction being illustrated below:

$3C_6H_5SiF_3 + Pb(OOCCH_3)_4 + 4HF + 6NH_4F$ water→
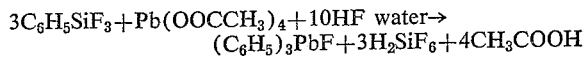

As byproduct we obtain a small amount of diphenyllead difluoride.

The reaction as illustrated will also proceed without the presence of ammonium fluoride, the yield being however somewhat smaller; by additional heating it is possible to improve the yield, with the non-isolated acid $H_2(C_6(H_5SiF_5)$ probably forming an effective intermediate compound.

The reaction proceeds as follows:

$3C_6H_5SiF_3 + Pb(OOCCH_3)_4 + 10HF$ water→
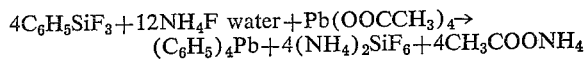

If we operate, on the other hand, without hydrofluoric acid, we obtain tetraphenyllead:

$4C_6H_5SiF_3 + 12NH_4F$ water $+ Pb(OOCCH_3)_4$→
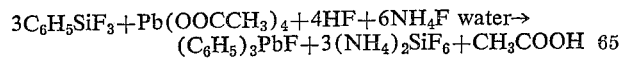

Phenyltriethoxysilane reacts with hydrofluoric acid and lead tetraacetate in diluted alcohol partly with formation of tetraphenyllead, but mainly formation of triphenyllead fluoride.

Ammoniummethyl- and ammoniummethylpentafluorosilicates likewise react e.g. with lead tetraacetate in the presence of ammonium fluoride in aqueous solution with formation of methyl- or ethyllead trifluoride, respectively.

The invention will now be more fully described with reference to a number of examples, but it should be understood that these are given by way of illustration and not of limitation, and that many changes in the details can be made without departing from the spirit of the invention.

EXAMPLE 1

44 g. lead tetraacetate are suspended in 85 g. of a 45% aqueous ammonium fluoride solution and 85 g. of 40% hydrofluoric acid, to which are added dropwise 81 g. phenyltrifluorosilane with water cooling and stirring. Desirable temperature is 40 to 70° C. For thinning the thick reaction mixture, we add 50 ml. 2% ammonium fluoride solution. After 30 minutes, another 50 ml. 2% ammonium fluoride solution are added, then filtration with suction is applied, and washing with water is continued until no more ammonium hexafluorosilicate can be detected in the washing water. Thereupon, the residue is rinsed twice with alcohol and dried on a clay plate. The yield of crude triphenyllead fluoride is 43 g. (94% of the theoretical amount). When extracted with methanol, the crude product yields 34 g. triphenyllead fluoride (75% of the theoretical amount) in the form of cotton-like white needles.

Analysis.—$(C_6H_5)_3PbF$: Calc. C, 47.26%; H, 3.3%; Pb, 45,29%; F, 4.15%. Found: C, 47.31%; H, 3.38%; Pb, 44.03%; F, 4.05%.

The residue consists of 9 g. diphenyllead difluoride (20% of the theoretical amount) which is slightly impure.

From the filtrate and washing water, 57 g. ammoniumhexafluorosilicate are precipitated as a repeated proof of the completed conversion.

EXAMPLE 2

48 g. lead tetraacetate are reacted according to Example 1 with 65 g. 40% hydrofluoric acid, but without addition of NH₄F, and with 99 g. phenyltrifluorosilane. Obtained were 34 g. crude triphenyllead fluoride (75% of the theoretical amount), a yield which could be increased to 84% by heating for 6 hours to 70° C.

EXAMPLE 3

To a suspension of 44 g. lead tetraacetate in 165 g. 45% ammonium fluoride solution, 130 g. phenyltrifluorosilane are added very rapidly, whereby the temperature rises to 70° C. After two hours, the crude reaction product is subjected to filtration with suction and further worked up as described in Example 1. Extraction with chloroform, instead of methanol, yields 39 g. tetraphenyllead (74% of the theoretical amount), F.P. 224° C. (according to literature: 226 to 228° C.). From the filtrate, 90 g. ammoniumhexafluorosilicate can be precipitated with alcohol.

EXAMPLE 4

To 44 g. lead tetraacetate dissolved in 120 g. 40% hydrofluoric acid, 96 g. phenyltriethoxysilane dissolved in 100 ml. alcohol are added dropwise. The solution heats up considerably so that cooling with water becomes necessary. The desirable temperature ranges from 40 to 70° C. In 30 minutes after the reaction is complete, water is added for dilution, suction is applied to the filter, the residue being washed with water and alcohol, and dried on a clay plate. Obtained are 30 g. crude product from which 9 g. tetraphenyllead are extracted with benzene (F.P. 225° C.). The residue is triphenyllead fluoride.

EXAMPLE 5

Into a polyethylene vessel or canister, 84 g. phenyltrichlorosilane are added dropwise to a mixture of 44 g. lead tetraacetate, 60 g. 40% hydrofluoric acid and 100 g. 45% ammoniumfluoride solution. The solution warms up considerably and the dark brown reaction mixture turns white. The solid mass is filtered with suction, washed and dried on a clay plate. Obtained are 35 g. crude triphenyllead fluoride (76% of the theoretical amount).

In the filtrate, yellow, oily drops are contained which are dissolved in benzene. The solution in benzene is dried with $Na_2SO_4$ and after having distilled off the benzene we obtain 12 g. tetraphenyllead (23% of the theoretical amount), F.P. 220° C., after recrystallization from alcohol.

EXAMPLE 6

In a three-neck flask equipped with thermometer, stirrer, reflux cooler and dropping funnel, 87 g. ammoniummethyl-pentafluorosilicate are mixed with 48 g. lead tetraacetate, and thereto are added fairly rapidly 212 g. 45% ammoniumfluoride solution while stirring. The temperature should reach 70° C. at the utmost. When the temperature is too high, cleavage of the complex will occur. After a while, the brown mixture will turn white. After two hours, another 55 g. 45% ammoniumfluoride solution are added and the solution is allowed to stand for 48 hours. Thereupon, heating to about 70° C. takes place for 16 hours. After cooling, filtration with suction is applied, and washing with water performed until no ammoniumhexafluorosilicate can be detected any longer; the mass is then dried on clay plates, the weight of the dry product is 35 g. The value for lead is found too low and this shows that the product is impure methyllead trifluoride.

Analysis.—$CH_3PbF_3$: Calc. C, 4.30%; H, 1.08%; Pb, 74.21%. Found: C, 4.54%; H, 1.18%; Pb, 66.7%.

EXAMPLE 7

40 g. vinyltrifluorosilane are introduced into a mixture of 42 g. lead tetraacetate in 220 g. 30% ammoniumfluoride solution; the solution warms up to 35° C. When heated additionally from the outside to 80° C., the dark suspension will become lighter after about 8 hours, and contains, after the usual work-up, 44 g. of a light brown crude product containing about 50% by weight of vinyllead trifluoride.

EXAMPLE 8

To 24 g. $PbO_2$ we add 66 g. of 70% HF in a polyethylene vessel and further add 65 g. $C_6H_5SiF_3$ drop by drop, whereby a strong rise in temperature occurs. After one hour's heating to 70° C., the product is allowed to stand overnight and is then filtered with suction, washed and dried on a clay plate. Obtained are 27 g. of crude reaction production which are extracted with methanol and yield crystals of $(C_6H_5)_2PbF_2$.

F found: 10.37%; F calc.: 9.15%.

EXAMPLE 9

48 g. lead tetraacetate are mixed with 94 g. ammoniumethylpentafluorosilicate and thereto are added 360 g. 30% aqueous ammonium fluoride solution drop by drop while stirring; a considerable rise in temperature occurs. After heating for three hours the product is allowed to stand overnight, and then worked up as usual. After extraction with water, ethylated trifluoride are obtained from the 49 g. of crude product.

Analysis of the ethylated trifluoride.—$C_2H_5PbF_3$: Calc. C, 8.19%; H, 1.72%; Pb, 70.65%. Found: C, 8.69%; H, 2.61%; Pb, 68.43%.

No analysis for F was made in Examples 6 and 9 because in alkyl compounds—as contrasted to aryl compounds—the determination of F according to the usual methods does not give accurate values.

What we claim is:

1. A process for preparing organolead compounds, which comprises subjecting a lead compound selected from the group consisting of lead tetraacetate and lead dioxide to organylation in solution with a compound selected from the group consisting of an organofluorosilicate and an organofluorosilicic acid.

2. The process as defined in claim 1, which comprises reacting a lead compound in solution with a trifunctional organosilane in the presence of a fluorine compound selected from the group consisting of HF, $NH_4F$, and HF plus $NH_4F$, whereby organofluorosilicic acid or a salt thereof are formed in situ, which will then react with the lead compound under organylation.

3. The process as defined in claim 1, wherein the organylation comprises alkylation, alkenylation and arylation.

4. A process for preparing organolead compounds, which comprises subjecting lead tetraacetate to organylation in an aqueous solution with a compound selected from the group consisting of an organofluorosilicate and an organofluorosilicic acid at a temperature in the approximate range of 60 to 70° C.

References Cited

UNITED STATES PATENTS

| | | | |
|---|---|---|---|
| 2,859,225 | 11/1958 | Blitzer et al. | 260—437 |
| 2,859,231 | 11/1958 | Blitzer et al. | 260—437 |
| 2,955,124 | 10/1960 | Blitzer et al. | 260—437 |
| 2,985,675 | 5/1961 | Blitzer et al. | 260—437 |
| 2,989,558 | 6/1961 | Blitzer et al. | 260—437 |

OTHER REFERENCES

Lodochnikova et al. Zhur. Obsh. Khimii (1959) vol. 29, Abstract SOV/79-29-7-32/83.

TOBIAS E. LEVOW, Primary Examiner

H. M. S. SNEED, Assistant Examiner